United States Patent Office 2,696,163
Patented Dec. 7, 1954

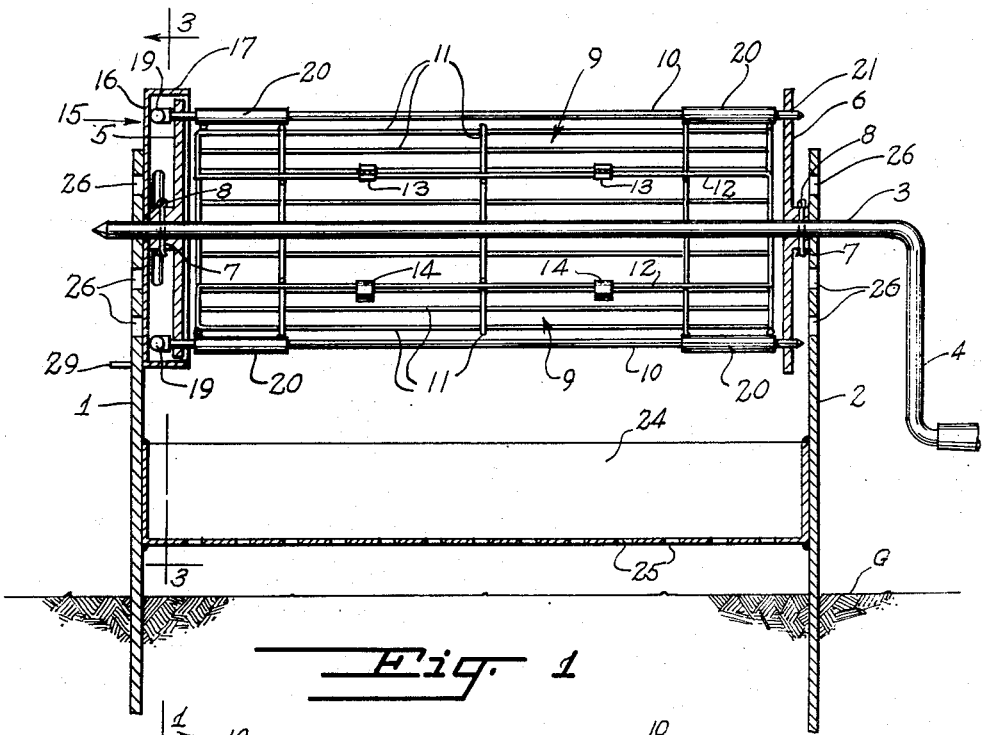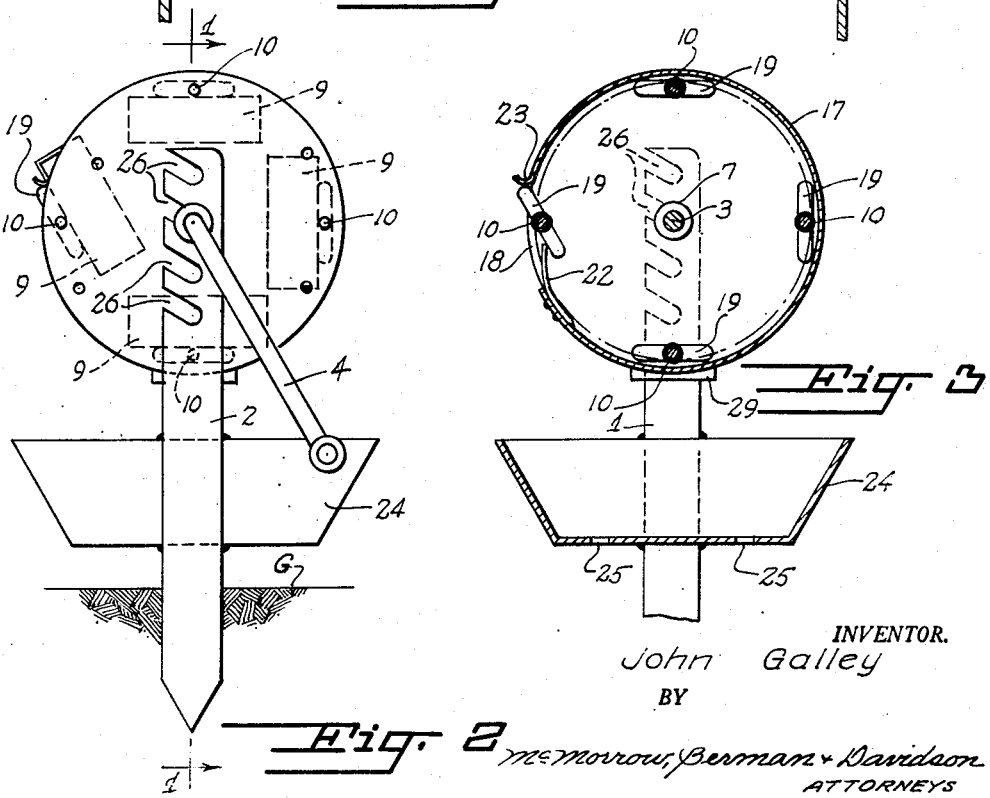
Fig. 1
Fig. 2
Fig. 3
INVENTOR.
John Galley
BY
McMorrow, Berman & Davidson
ATTORNEYS

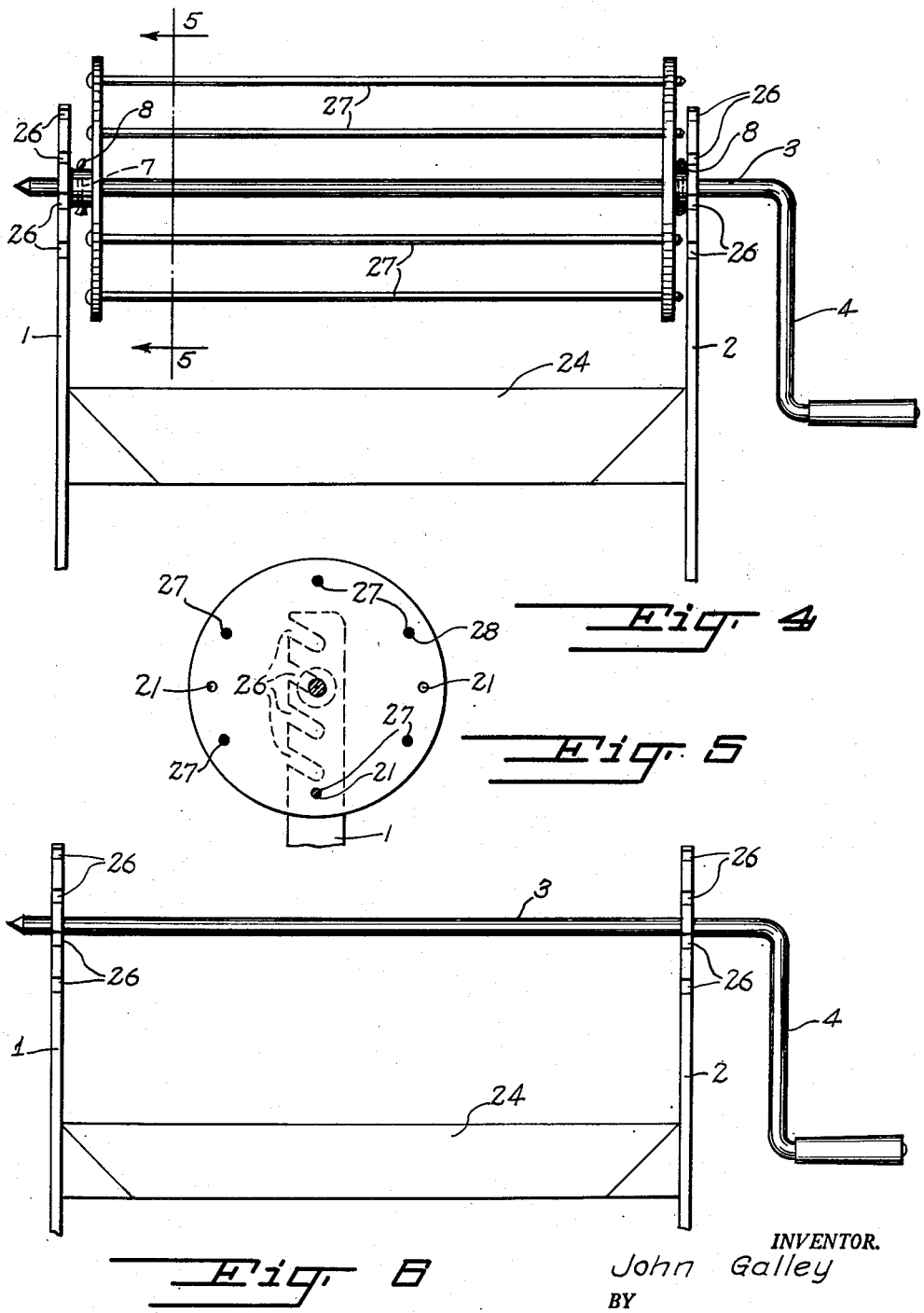

2,696,163

BARBECUE APPARATUS

John Galley, Wichita, Kans.

Application January 22, 1954, Serial No. 405,536

2 Claims. (Cl. 99—427)

This invention relates to barbecue apparatus.

An object of the invention is to provide a barbecue apparatus to which food may be firmly secured for turning over a fire without being impaled upon a spit or otherwise having its surface broken.

Another object of the invention is to provide a barbecue apparatus adapted to turn food over a fire so as to expose all surfaces equally in order to promote even cooking thereof.

Another object of the invention is to provide a barbecue apparatus in which the food turning element may be adjusted to different heights above the fire.

Another object of the invention is to provide a barbecue apparatus which may be made self-basting.

Another object of the invention is to provide a barbecue apparatus in which the fuel may be supported above the level of the ground.

A further object of the invention is to provide a barbecue apparatus which may be easily knocked down and easily reassembled.

Other objects and advantages of the invention will appear from the following description considered in conjunction with the attached drawing, in which:

Figure 1 is a view taken along the line 1—1 of Figure 2.

Figure 2 is a side elevational view of the apparatus of the present invention.

Figure 3 is a view taken along the line 3—3 of Figure 1.

Figure 4 is a side elevational view of a modified form of the apparatus of the present invention.

Figure 5 is a view taken along the line 5—5 of Figure 4.

Figure 6 is a side elevational view of a further modified form of the apparatus of the present invention.

Referring now to the drawings in more detail, numerals 1 and 2 designate a pair of spaced uprights. The lower ends of the uprights 1 and 2 are sharpened for insertion in the ground G and their upper portions are provided with a plurality of spaced notches 26 extending inwardly and downwardly from one edge of the uprights 1 and 2. A horizontally disposed shaft 3 is rotatably supported in the uprights 1 and 2 intermediate its ends and has hand actuable means, a crank 4, operatively connected to one of its ends for effecting its rotation. The shaft 3 may be seated in any pair of corresponding notches 26 and thus may be supported in the uprights selectively at different heights from the ground. A vertically disposed plate 5 and 6 is positioned inwardly of and spaced from each of the uprights 1 and 2 and is connected to the shaft 3 for rotation therewith. The connection between the plates 5 and 6 of the shaft 3 is made by cotter pins 8 which are placed in registering cotter-ways extending through the hubs 7 and the shaft 3.

A plurality of cages 9, arranged in longitudinal spaced relation about the shaft 3, are each connected to the plates 5 and 6 for rotary movement about a separate horizontal axis, or bar 10. Each cage 9 is formed of spaced wire strands 11 welded, or otherwise fixedly secured, together at points of juncture and has a top 12 hingedly connected to one of its sides by clips 13 and detachably engaged to its opposite side by catches 14. One of the bars 10 extends longitudinally along the bottom of each cage 9, intermediate its sides, and has enlarged portions 20 adjacent either end which are fixedly secured to the adjacent portions of the cage 9 by welding or other appropriate means. The ends of the bars 10 are rotatably engaged in apertures 21 in the adjacent plates 5 and 6 at sufficient distance from the shaft 3 to permit rotation of the cages 9 upon the bars 10 without striking the shaft 3.

A housing 15 is cooperatively mounted with respect to the plate 5, being loosely supported upon the shaft 3 between the plate 5 and the upright 1 and being prevented from rotating with the shaft by means of projections 29 abutting either edge of the upright 1. The housing 15 embodies a bottom 16 and a wall 17 extending about the bottom 16, the wall 17 being adjacent to the plate 5 and having a slot 18 formed therein. An arm 19, connected intermediate its ends to the end of the bar 10 projecting exteriorly of the plate 5, has its ends engaging the inner surfaces of the wall 17 for holding each of the cages 9 against free rotation about its axis during the rotational movement of the shaft 3. A tripping member, embodying a leaf spring 22, is positioned within the housing 15 adjacent the slot 18 and has one end fixed to the wall 17 of the housing 15 and has the other end adjacent to the slot 18 and in the path of travel of the arms 19. The spring 22 is thus selectively engageable with each of the arms 19, upon rotational movement of the shaft 3, to cause partial rotational movement of the respective cages 9 about their axes 10. The side of the slot 18 remote from the spring 22 may be provided with an outwardly turned portion 23, which is adapted to cooperate with the spring 22 in turning the arm 19 through an arc of 180° when the arm 19 reaches the slot 18 in the course of its passage about the inner surface of the wall 17 as the shaft 3 is rotated.

A pan 24, provided with apertures 25 in its bottom, is supported upon the uprights 1 and 2 below and spaced from the lower of the notches 26.

When the apparatus just described has been set up and the cooking fire has been properly prepared, the meat, fowl, or other food to be barbecued is placed, in pieces of suitable size, in one or more of the cages 9 and the tops 12 are closed and secured by the catches 14. The shaft 3 is then rotated by the manual turning of the crank 4. As the crank 4 is turned the cages 9 containing the food move in a circle about the shaft 3, the arms 19 sliding upon the inner surface of the wall 17 and restraining the cages 9 from rotation about the bars 10 until the arms 19 reach the leaf spring 22. When the arms 19 pass over the leaf spring 22 they are rocked outwardly as shown in Figure 3, and their forward ends strike against the turned edge 23. The continued rotation of the shaft 3 causes the arms 19 to be turned completely over, through an arc of 180°, turning the attached cages 9 with them. In this way, as the shaft 3 is turned, the cages 9 make one circuit of the shaft with their bottoms always facing the shaft and then, as the arms 19 reach the slots 18, are inverted and make the next circuit with their tops always facing the shaft 3. Thus, the side of the food exposed to the fire at the point of the closest approach thereto is continually alternated to promote the even cooking of the food. To move the entire rotary portion of the apparatus nearer to or further from the fire all that is necessary is to transfer the shaft 3 to a lower or higher pair of notches 26 in the uprights 1 and 2. The pan 24 may be used as a support for the cooking coals or as a receptacle for the juices dropping from the food. In the latter case, if the shaft 3 is set in the lower pair of the notches 26, the cages 9 will dip into the pan at the lower extremity of their path about the shaft 3 and the apparatus will become self-basting.

As an alternative to the use of the cages 9, as just described, the apparatus of the present invention may be used with a plurality of rods 27 positioned in longitudinal spaced relation with respect to the shaft 3 and their ends secured in the apertures 21 and 28 of the plates 5 and 6, as shown in Figure 4. This modification of the apparatus is useful for barbecuing pieces of food too large to fit within the cages 9. The apparatus may be further modified by removal of the rods 27 and the plates 5 and 6, as shown in Figure 6. In the latter form, the food to be barbecued is impaled upon the shaft 3.

What is claimed is:

1. A barbecue apparatus comprising a pair of spaced uprights, a horizontally disposed shaft rotatably supported in said uprights intermediate the ends thereof, hand actuable means operatively connected to said shaft for effecting the rotation of said shaft, a vertically disposed plate positioned inwardly of and spaced from each of said uprights and connected to said shaft for rotation therewith, a plurality of cages arranged in longitudinal spaced relation about said shaft and each connected to said plates for rotary movement about a separate horizontal axis, a housing cooperatively mounted with respect to one of said plates, an arm connected intermediate its ends to the portion of each of said axes adjacent said one plate and having its ends engaging the wall of said housing for holding each cage against free rotation about its axis during rotational movement of said shaft, and a tripping member fixedly carried by said housing and selectively engageable with each of said arms upon rotational movement of said shaft to cause partial rotational movement of the respective cages about their axes.

2. A barbecue apparatus comprising a pair of spaced uprights, a horizontally disposed shaft rotatably supported in said uprights intermediate the ends thereof, hand actuable means operatively connected to said shaft for effecting the rotation of said shaft, a vertically disposed plate positioned inwardly of and spaced from each of said uprights and connected to said shaft for rotation therewith, a plurality of cages arranged in longitudinal spaced relation about said shaft and each connected to said plates for rotary movement about a separate horizontal axis, a housing cooperatively mounted with respect to one of said plates, said housing embodying a bottom and a wall extending about the boundary of said bottom, the wall of said housing being adjacent to said one plate and having a slot formed therein, an arm connected intermediate its ends to the portion of each of said axes adjacent said one plate and having its ends engaging the wall of said housing for holding each cage against free rotation about its axis during rotational movement of said shaft, and a tripping member embodying a leaf spring positioned within said housing adjacent said slot and having one end fixed to the wall of said housing and having the other end adjacent to said slot and in the path of travel of said arms and selectively engageable with each of said arms upon rotational movement of said shaft to cause partial rotational movement of the respective cages about their axes.

References Cited in the file of this patent

UNITED STATES PATENTS

| Number | Name | Date |
|---|---|---|
| 2,039,541 | Lekometros | May 5, 1936 |